US008130783B2

(12) United States Patent
Lee et al.

(10) Patent No.: US 8,130,783 B2
(45) Date of Patent: Mar. 6, 2012

(54) METHOD OF JOINING A CELL USING A PROXY COORDINATOR, AND A NETWORK THEREFOR

(75) Inventors: Ju-han Lee, Suwon-si (KR); Joon-hee Lee, Gunpo-si (KR); Jun-hae Choi, Seongnam-si (KR); Hyun-ah Sung, Seoul (KR); In-hwan Kim, Suwon-si (KR); Seung-gi Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 958 days.

(21) Appl. No.: 11/648,625

(22) Filed: Jan. 3, 2007

(65) Prior Publication Data

US 2007/0218921 A1    Sep. 20, 2007

(30) Foreign Application Priority Data

Mar. 20, 2006 (KR) .................. 10-2006-0025399

(51) Int. Cl.
*H04L 12/413* (2006.01)
(52) U.S. Cl. ........................................ 370/445; 370/338
(58) Field of Classification Search .............. 370/230, 370/329, 254, 408, 326, 315, 336, 345, 274, 370/445, 310.2, 328, 338, 485–490, 492; 380/277; 455/420, 402, 418, 419, 11.1, 13.1, 455/13.4, 3.03, 41.2; 340/310.11, 310.16, 340/538; 379/167.01–167.15
See application file for complete search history.

(56) References Cited

U.S. PATENT DOCUMENTS 6,754,176 B1 * 6/2004 Gubbi et al. .................. 370/230
(Continued)

FOREIGN PATENT DOCUMENTS

KR    2005-63612    6/2005

OTHER PUBLICATIONS

Korean Office Action dated Apr. 26, 2007 issued in KR 2006-25399.

*Primary Examiner* — Kent Chang
*Assistant Examiner* — San Htun
(74) *Attorney, Agent, or Firm* — Stanzione & Kim, LLP

(57) ABSTRACT

A method of joining a cell by using a proxy coordinator. The method of joining a cell by using a proxy coordinator includes requesting a second device to operate as a proxy coordinator from a first device positioned out of a beacon frame reachable area of the cell, transmitting a time period to operate as the proxy coordinator allocated by a coordinator of the cell, informing the first device that the second device can operate as the proxy coordinator, transmitting a cell join request to the proxy coordinator from the first device through the second device, and transmitting a beacon frame including time allocation information from the coordinator to the first device through the second device.

29 Claims, 4 Drawing Sheets

U.S. PATENT DOCUMENTS

| | | | |
|---|---|---|---|
| 7,826,475 B2 * | 11/2010 | Lee et al. | 370/445 |
| 2002/0048368 A1 * | 4/2002 | Gardner | 380/277 |
| 2004/0152416 A1 * | 8/2004 | Dahl | 455/41.2 |
| 2004/0174829 A1 * | 9/2004 | Ayyagari | 370/254 |
| 2005/0169292 A1 * | 8/2005 | Young | 370/432 |
| 2005/0174950 A1 * | 8/2005 | Ayyagari | 370/254 |
| 2007/0026794 A1 * | 2/2007 | Ayyagari et al. | 455/11.1 |

* cited by examiner

METHOD OF JOINING A CELL USING A PROXY COORDINATOR, AND A NETWORK THEREFOR

CROSS-REFERENCE TO RELATED APPLICATIONS

This application claims the priority under 35 U.S.C. 119§ (a) from Korean Patent Application No. 10-2006-0025399, filed on Mar. 20, 2006, in the Korean Intellectual Property Office, the disclosure of which is incorporated herein in its entirety by reference.

BACKGROUND OF THE INVENTION

1. Field of the Invention

The present general inventive concept relates to a cell joining method and network using a proxy coordinator, and more particularly, to a method of joining a cell by using a proxy coordinator in which a device positioned out of a beacon frame reachable area can join the cell without colliding with a device already existing in the cell, and a network therefor.

2. Description of the Related Art

A home network connects information appliances at home, thereby enabling communication between persons, between persons and devices, and between devices. Accordingly, the home network technology allows users to easily control appliances at home without restrictions of space and devices, and provides a wider variety of information items and services.

Recently, consumer appliances, such as TVs, refrigerators, and computers, have been evolving as information appliances through data exchange among appliances. In addition, home appliances using power line communication (PLC) have been introduced so that networked indoor home appliances, lights, and gas valves can be remotely controlled by a mobile phone or through the Internet from an outdoor place.

The PLC means a technology enabling communication through power lines connected to households not using dedicated communication lines.

Also, since the PLC enables communication by loading hundreds of kilohertz to tens of megahertz high frequency signals on the power lines, and at present, power lines are connected to all households, if the power lines are used, the PLC can be easily implemented without requiring separate wiring. That is, only a plug is connected to a power outlet, communication is enabled.

Also, the PLC has been originally developed for controlling consumer electronic appliances on the basis of low speed communication, but with the recent development of high speed power line communication technologies, high speed Internet services can be provided through the PLC even without using the conventional communication networks, and power, flux, and gas can also be automatically checked. In addition, home networks, information appliances, and power line networks can be managed through the PLC and in particular, high speed access technologies using the PLC and a low speed control technology through a home network have been highlighted as next-generation communication technologies.

Meanwhile, MAC technology, which has been suggested by Homeplug Alliance (an alliance of North American power line communication industries), uses a central arbiter method which controls access of transmission media in a time division multiple access (TDMA) method using a coordinator apparatus to transmit and receive a beacon frame. In the MAC technology, an area where PLC communication is possible is defined as a logical cell, which is managed by a beacon frame transmitted by a coordinator, and a device transmits a cell join request to the coordinator in order to join the cell. A device which has successfully joined the cell requests time allocation to the coordinator and by using an allocated time period performs PLC communication. The transmission media include a PLC part as a transmission path between devices, and also include, for example, paired cables, coaxial cables, radio wave links, waveguides, and optical cables.

FIG. 1 is a diagram illustrating a conventional PLC cell 10 and a proxy coordinator relaying a beacon frame.

The PLC cell 10 that is a PLC network is formed by a coordinator 20 and a device (hereinafter referred to as a "first device") which wants to join the cell 10 transmits a cell join request to the coordinator 20. If the coordinator 20 approves the joining and the first device joins the cell, the first device receives time allocation information on a time which the first device will use, through a beacon frame transmitted from the coordinator 20.

Here, a proxy coordinator 30 can be operated in order to allow the first device positioned out of the beacon frame reachable area to join the cell 10. The proxy coordinator 30 is responsible for relaying the beacon frame.

In order for the first device to access transmission media without colliding with existing devices, the first device should be allocated a time period for its own use and use the time period. Accordingly, the first device transmits a frame including a request (hereinafter a "cell join request") for the first device to join the cell 10, to the coordinator 20. However, it is difficult to determine when the frame including the cell join request should be transmitted to the coordinator 20 without collision with existing cell devices. That is, since the first device cannot know previously generated time allocation information of the cell 10, the frame transmitted to the cell 10 can interfere with the existing cell 10.

In addition, even though the first device receives the time allocation information of the existing cell 10 through the beacon frame relayed by the proxy coordinator 30, the time when the first device receives the beacon frame is inevitably a predetermined time after the coordinator 20 transmits the beacon frame. Accordingly, the first device receives the relayed beacon frame at a time after the transmission of the beacon frame by the coordinator 20, the time being the sum of a transmission time from the coordinator 20 to the proxy coordinator 30, a processing time in which the proxy coordinator 30 receives and processes the beacon frame, and a transmission time from the proxy coordinator 30 to the first device.

Accordingly, it is difficult to synchronize with the existing cell 10 and communicate with the cell 10. Though a cell join request may be transmitted through a trial and error method using a carrier sense multiple access/collision avoidance (CSMA/CA) method, a collision can result with an existing device which wants to be allocated as a transmission medium from the coordinator 20 and to use the transmission medium.

Accordingly, there is a need to allow a device positioned out of the beacon frame reachable area, to join a cell without colliding with an existing cell device.

SUMMARY OF THE INVENTION

The present general inventive concept provides a method of joining a cell by using a proxy coordinator.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may also be achieved by providing a method of joining a cell by using a proxy coordinator, the method including requesting a second device to operate as a proxy coordinator from a first device positioned out of a beacon frame reachable area of the cell, transmitting a time period to operate as the proxy coordinator allocated by a coordinator of the cell, informing the first device that the second device operates as the proxy coordinator, transmitting a cell join request to the proxy coordinator from the first device, and transmitting a beacon frame including time allocation information from the coordinator to the first device through the proxy coordinator.

The foregoing and/or other aspects and utilities of the present general inventive concept may also be achieved by providing a power line communication (PLC) network, including a device included in a PLC cell of a PLC network to receive a first request to designate the device as a proxy coordinator from an external device connected to the device, and a second request to join the PLC cell from the external device, and a coordinator included in the PLC cell to generate a beacon frame having a beacon period, a CAP period to indicate the joining of the device in the PLC cell, and a CFP period to indicate the designation of the device as the proxy coordinator, according to at least one of the first request and the second request.

The PLC network may further include a transmission and reception module to transmit and receive data among the device, the proxy coordinator, and the coordinator.

The PLC network may further include an allocation module to allocate a time to the device to act as the proxy coordinator.

The PLC network may further include a setting module to set time allocation information to the device to avoid collision with other devices of the PLC network.

The CAP period may be a period in which a transmission medium is accessed in a carrier sense multiple access/collision avoidance method.

The CFP may further include a time slot to which a device is allocated when another request is made to the coordinator.

The foregoing and/or other aspects and utilities of the present general inventive concept may also be achieved by providing a power line communication (PLC) network, including a coordinator included in the PLC cell to communicate with a device of the PLC cell and an external device out of the PLC cell, and to generate a beacon frame having a beacon period, a CAP period to indicate the joining of the external device in the PLC cell, and a CFP period to indicate the designation of the device as a proxy coordinator according to a request from the external device through the device.

The beacon frame may further include time scheduling and quality of service related information.

The CAP period may be a period in which a transmission medium is accessed in a carrier sense multiple access/collision avoidance method.

The CFP period may further include a time slot to which a device is allocated when another request is made to the coordinator.

The foregoing and/or other aspects and utilities of the present general inventive concept may also be achieved by providing a power line communication (PLC) network, including a device included in a PLC cell of a PLC network to communicate with an external device out of the PLC cell, to receive a first request to designate the device as a proxy coordinator from the external device connected to the device, and a second request to join the PLC cell from the external device, and to transmit a beacon frame from a coordinator to the external device in response to at least one of the first request and the second request.

The PLC network may further include a transmission and reception module to transmit and receive data between the device, the proxy coordinator, and the coordinator.

The PLC network may further include an allocation module to allocate a time to the device to act as the proxy coordinator.

The PLC network may further include a setting module to set time allocation information to the device to avoid collision with other devices.

The foregoing and/or other aspects and utilities of the present general inventive concept may also be achieved by providing a power line communication (PLC) network, including a device disposed out of a PLC cell of a PLC network to be connected to another device of the PLC cell of the PLC network, to transmit to the another device a first request to designate the another device as a proxy coordinator, and a second request to join the PLC cell, and to receive a beacon frame having a beacon period, a CAP period to indicate the joining of the device in the PLC cell, and a CFP period to indicate the designation of the device as the proxy coordinator in response to the first request and the second request.

The foregoing and/or other aspects and utilities of the present general inventive concept may also be achieved by providing a power line communication (PLC) network, including a device disposed out of a PLC cell of a PLC network, another device included in the PLC cell of the PLC network and connected to the device to receive a first request to designate the device as a proxy coordinator from the device, and a second request to join the PLC cell from the device, and a coordinator included in the PLC cell to generate a beacon frame having a beacon period, a CAP period to indicate the joining of the device in the PLC cell, and a CFP period to indicate the designation of the device as the proxy coordinator according to the first request and the second request transmitted from the device through the another device.

The foregoing and/or other aspects and utilities of the present general inventive concept may also be achieved by providing a method of joining a cell by using a proxy coordinator, the method including receiving a first request to designate a device of a PLC cell of a PLC network as a proxy coordinator from an external device connected to the device, and a second request to join the PLC cell from the external device, and generating a beacon frame having a beacon period, a CAP period to indicate the joining of the device in the PLC cell, and a CFP period to indicate the designation of the device as the proxy coordinator according to the first request and the second request.

The foregoing and/or other aspects and utilities of the present general inventive concept may also be achieved by providing a method of joining a cell by using a proxy coordinator, the method including communicating with a device of the PLC cell and an external device out of the PLC cell to generate a beacon frame having a beacon period, indicating the joining of the external device in the PLC cell, and indicating the designation of the device as a proxy coordinator according to a request from the external device through the device.

The foregoing and/or other aspects and utilities of the present general inventive concept may also be achieved by providing a method of joining a cell by using a proxy coordinator, the method including communicating with an external device out of the PLC cell, to receive a first request to designate the device as a proxy coordinator from the external device connected to the device and a second request to join the PLC cell from the external device; and transmitting a beacon frame from a coordinator to the external device in response to at least one of the first request and the second request.

The foregoing and/or other aspects and utilities of the present general inventive concept may also be achieved by providing a method of joining a cell by using a proxy coordinator, the method including transmitting from a device disposed out of a PLC cell of a PLC network to be connected to another device of the PLC cell of the PLC network to the another device a first request to designate the another device as a proxy coordinator, and a second request to join the PLC cell; and receiving a beacon frame having a beacon period, a CAP period to indicate the joining of the device in the PLC cell, and a CFP period to indicate the designation of the device as the proxy coordinator in response to the first request and the second request.

The foregoing and/or other aspects and utilities of the present general inventive concept may also be achieved by providing a method of joining a cell by using a proxy coordinator, the method including disposing a device out of a PLC cell of a PLC network, connecting another device included in the PLC cell of the PLC network to the device to receive a first request to designate the device as a proxy coordinator from the device, and a second request to join the PLC cell from the device, and generating a beacon frame having a beacon period, a CAP period to indicate the joining of the device in the PLC cell, and a CFP period to indicate the designation of the device as the proxy coordinator according to the first request and the second request transmitted from the device through the another device.

The foregoing and/or other aspects and utilities of the present general inventive concept may also be achieved by providing a computer readable recording medium having embodied thereon a computer program to execute a method, wherein the method includes receiving a first request to designate a device of a PLC cell of a PLC network as a proxy coordinator from an external device connected to the device, and a second request to join the PLC cell from the external device, and generating a beacon frame having a beacon period, a CAP period to indicate the joining of the device in the PLC cell, and a CFP period to indicate the designation of the device as the proxy coordinator according to the first request and the second request.

The foregoing and/or other aspects and utilities of the present general inventive concept may also be achieved by providing a computer readable recording medium having embodied thereon a computer program to execute a method, wherein the method includes communicating with a device of the PLC cell and an external device out of the PLC cell to generate a beacon frame having a beacon period, indicating the joining of the external device in the PLC cell, and indicating the designation of the device as a proxy coordinator according to a request from the external device through the device.

The foregoing and/or other aspects and utilities of the present general inventive concept may also be achieved by providing a computer readable recording medium having embodied thereon a computer program to execute a method, wherein the method includes communicating with an external device out of the PLC cell, to receive a first request to designate the device as a proxy coordinator from the external device connected to the device and a second request to join the PLC cell from the external device, and transmitting a beacon frame from a coordinator to the external device in response to at least one of the first request and the second request.

The foregoing and/or other aspects and utilities of the present general inventive concept may also be achieved by providing a computer readable recording medium having embodied thereon a computer program to execute a method, wherein the method includes transmitting from a device disposed out of a PLC cell of a PLC network to be connected to another device of the PLC cell of the PLC network to the another device a first request to designate the another device as a proxy coordinator, and a second request to join the PLC cell; and receiving a beacon frame having a beacon period, a CAP period to indicate the joining of the device in the PLC cell, and a CFP period to indicate the designation of the device as the proxy coordinator in response to the first request and the second request.

The foregoing and/or other aspects and utilities of the present general inventive concept may also be achieved by providing a computer readable recording medium having embodied thereon a computer program to execute a method, wherein the method includes disposing a device out of a PLC cell of a PLC network, connecting another device included in the PLC cell of the PLC network to the device to receive a first request to designate the device as a proxy coordinator from the device, and a second request to join the PLC cell from the device, and generating a beacon frame having a beacon period, a CAP period to indicate the joining of the device in the PLC cell, and a CFP period to indicate the designation of the device as the proxy coordinator according to the first request and the second request transmitted from the device through the another device.

The foregoing and/or other aspects and utilities of the present general inventive concept may also be achieved by providing a computer readable recording medium having embodied thereon a computer program to execute a method, wherein the method includes transmitting from a device to be connected a first request to designate the device as a proxy coordinator from an external device connected to the device, to another device of a PLC cell of a PLC network, and receiving a beacon frame having a beacon period, a CAP period to indicate the joining of the device in the PLC cell, and a CFP period to indicate the indication of the device as the proxy coordinator.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
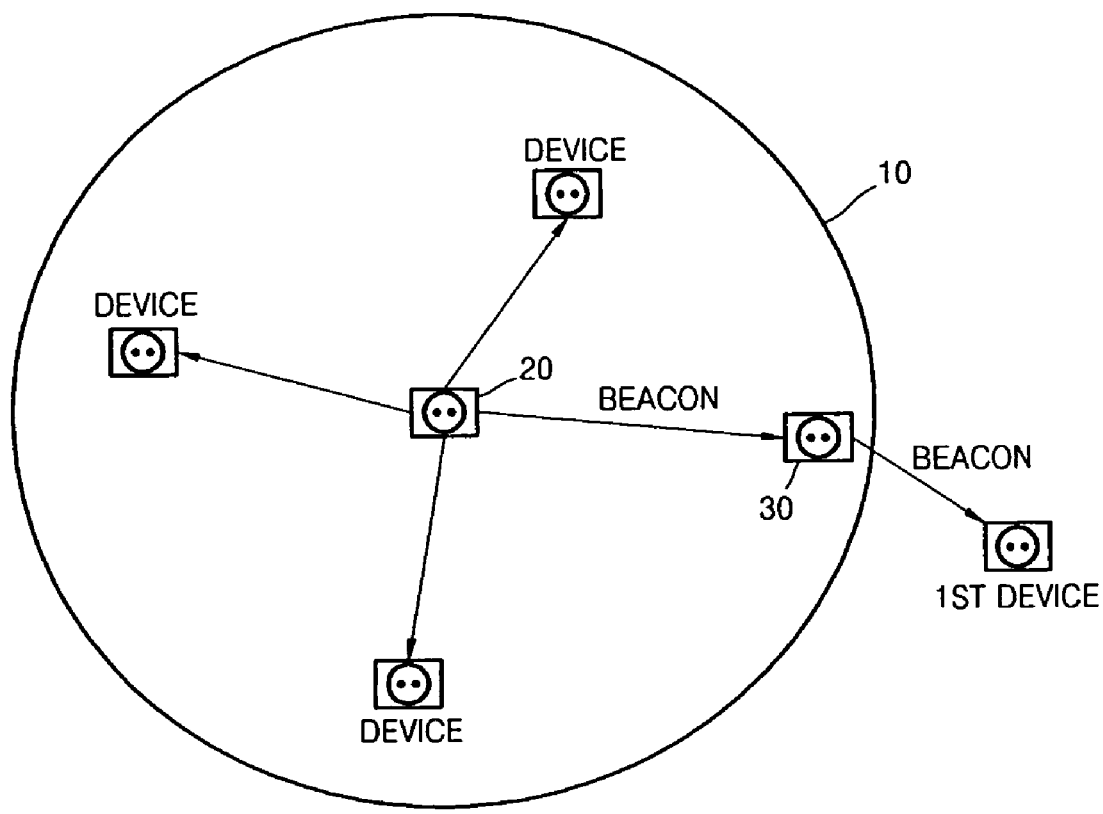
FIG. 1 is a diagram illustrating a power line communication (PLC) cell and a proxy coordinator relaying a beacon frame according to conventional technology.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
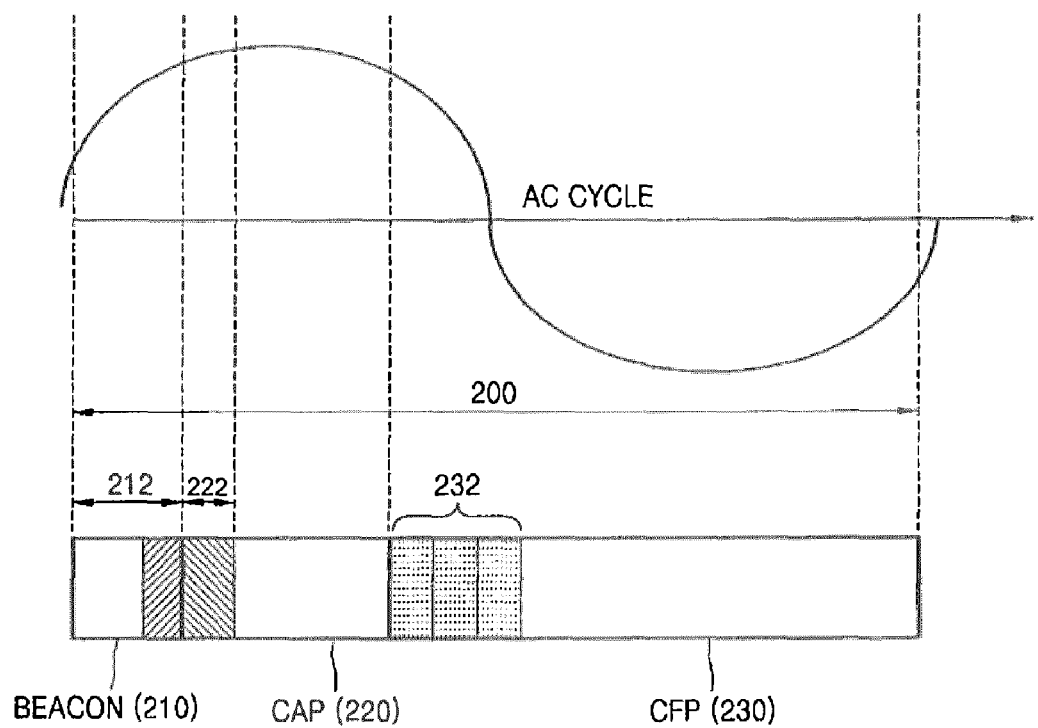
FIG. 2 is a diagram illustrating a structure of a superframe according to an embodiment of the present general inventive concept.

FIG. 2 is a diagram illustrating a structure of a superframe 200 according to an embodiment of the present general inventive concept.

In power line communication (PLC) a 60 Hz alternate current (AC) line cycle repeats, and the start and end of the superframe 200 of the current embodiment are synchronized with one cycle of an AC line cycle.

A method of requesting a cell join by a device positioned out of a beacon frame reachable area will now be explained with reference to the structure of the superframe 200 and a cell join apparatus and method of FIGS. 3 and 4, which will be explained later.

The superframe 200 is a basic time division unit which forms a PLC network cell, and the superframe 200 includes a beacon period 210, a contention access period 220 which is a contention-based access period (CAP), and a contention free period 230. The PLC network may have a structure similar to FIG. 1.

In the beacon period 210, a beacon frame of a maximum size can be transmitted during a max beacon period 212. That is, the beacon frame transmitted by a coordinator includes time scheduling and quality of service (QoS) related information that should be transferred to member devices inside the cell.

An unlimited quantity of information cannot be included in the beacon frame, and a predetermined threshold upper limit value (Max) should be determined to correspond to the limited quantity of information. The max beacon period 212 is a period in which a threshold upper limit value is expressed by a time.

The CAP period 220 that is a contention-based access period can include a minimum CAP period (minimum contention-based access period) 222, and the min CAP period 222 is a period that should be guaranteed at least in the superframe 200. If transmission of the beacon frame is completed, the CAP period 220 that is a content-based access period in which a transmission medium can be accessed in a carrier sense multiple access/collision avoidance (CSMA/CA) method follows. If the CAP period 220 is used, even a device that is not separately allocated a time can access a transmission medium through contention.

Accordingly, a device (a first device) positioned out of the beacon frame reachable area can transmit a cell join request by using the min CAP period 222, and therefore not using the beacon period 210 or the CFP period 230 allocated uniquely to each device.

The CFP period 230 may include a max contention free slot (MCFS) 232, and the MCFS 232 is a time (period) reserved for a predetermined management purpose, and may be a time period in which a device operates as the proxy coordinator for relaying the beacon frame. A device (first device) accesses a transmission medium in a time division multiple access (TDMA) during the CFP period 230 and the CFP period 230 is again divided into a plurality of contention free slots (CFSs) (not shown). A CFS slot is a time (slot) to which a device is allocated when a request is made to the coordinator, and during the time, other devices besides the first device cannot access the transmission medium. Accordingly, without contention with other devices, the QoS can be guaranteed to the device which is allocated to the CFS slot.

Figure 3:
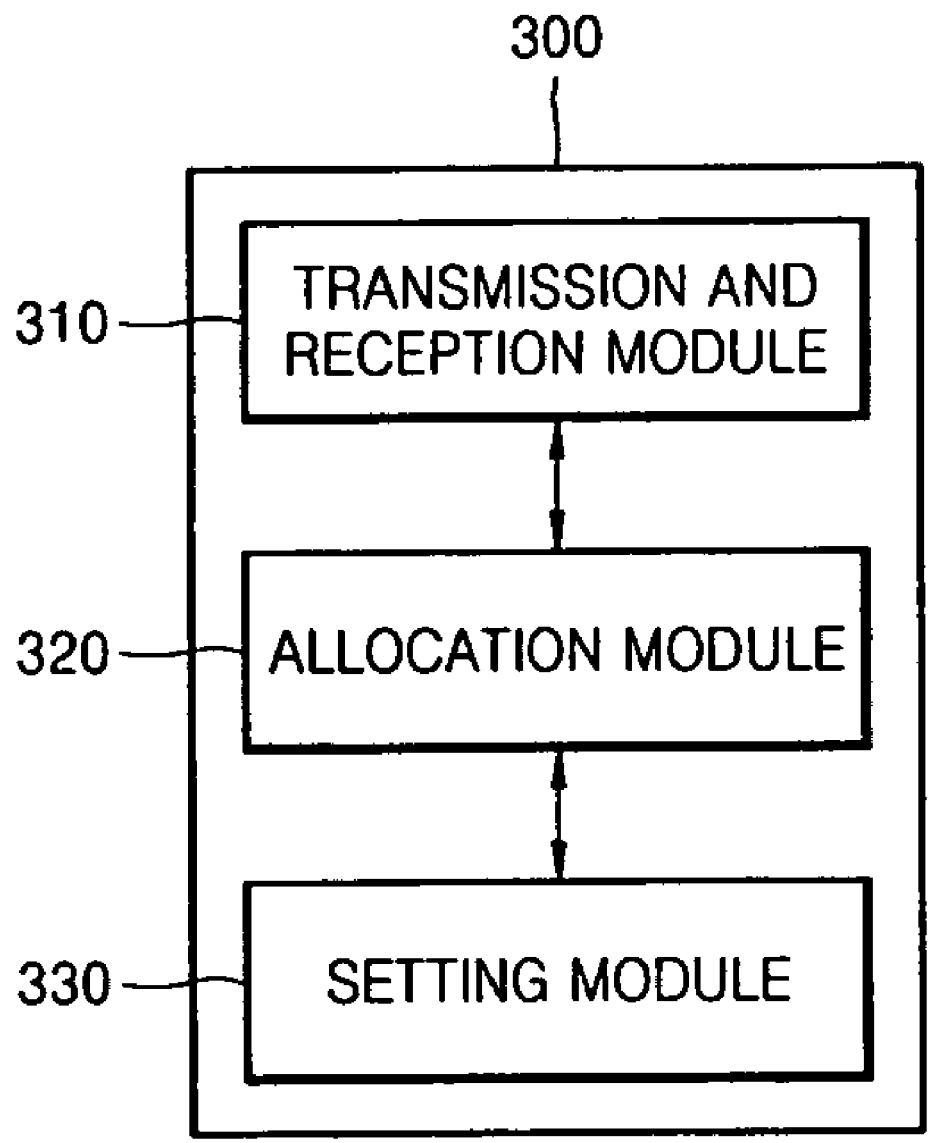
FIG. 3 is a diagram illustrating a cell join apparatus according to an embodiment of the present general inventive concept.

FIG. 3 is a diagram illustrating a cell join apparatus 300 according to an embodiment of the present general inventive concept.

Through the cell join apparatus 300, a device (first device) positioned out of a beacon frame reachable area of a PLC network can perform PLC communication by joining a cell of the PLC network without colliding with existing cell devices of the PLC network or external cell devices.

The cell join apparatus 300 includes a transmission and reception module 310, an allocation module 320, and a setting module 330.

The transmission and reception module 310 transmits and receives data between the first device, a proxy coordinator, and a coordinator. For example, since the first device positioned out of the beacon frame reachable area cannot directly receive a beacon frame, in order to select a proxy coordinator which will relay the beacon frame, the first device requests through the transmission and reception module 310, a device (hereinafter a "second device") to operate as a proxy coordinator. Referring to FIG. 2, by using the min CAP period 222 that is immediately after a time when the max beacon period 212 finishes, the first device transmits a cell join request to the proxy coordinator through the transmission and reception module 310. The second device may be a device disposed adjacent to the first device or a device directly connected to the first device to join the PLC cell of the PLC network and to communicate with other devices of the PLC network.

The allocation module 320 allocates the second device a time in which the second device can operate as the proxy coordinator. That is, the second device, which is requested to operate as the proxy coordinator by the first device, requests through the transmission and reception module 310 the coordinator to allocate a time (period) in which the second device can operate as the proxy coordinator to relay the beacon frame. Then, the coordinator allocates the second device an MCFS slot 232, i.e., a time (slot) in which the second device can operate as the proxy coordinator, through the allocation module 320.

The setting module 330 sets time allocation information for the first device.

That is, the coordinator approves the cell join request of the first device, and sets time allocation information for the first device through the setting module. Then, the coordinator includes the time allocation information in the beacon frame and transmits the beacon frame to the proxy coordinator through the transmission and reception module 310. Since the first device is allocated its own time (CFS slot) according to the time allocation information, the first device can access a transmission medium according to the time allocation information without colliding with adjacent devices.

Here, the "module" indicates a hardware element, such as a field programmable gate array (FPGA), or an application specific integrated circuit (ASIC), and performs a predetermined role. However, the module is not limited to software or hardware. The module may be formed on a storage medium that can be addressed, or may be formed to operate one or more processors.

Accordingly, for example, the module may include elements, such as software elements, object-oriented software elements, class elements, and task elements, processes, functions, attributes, procedures, subroutines, program code segments, drivers, firmware, microcodes, circuits, data, databases, data structures, tables, arrays, and variables. Elements and functions provided in modules may be combined into a less number of elements and modules, or may be further divided into additional elements and modules.

Figure 4:
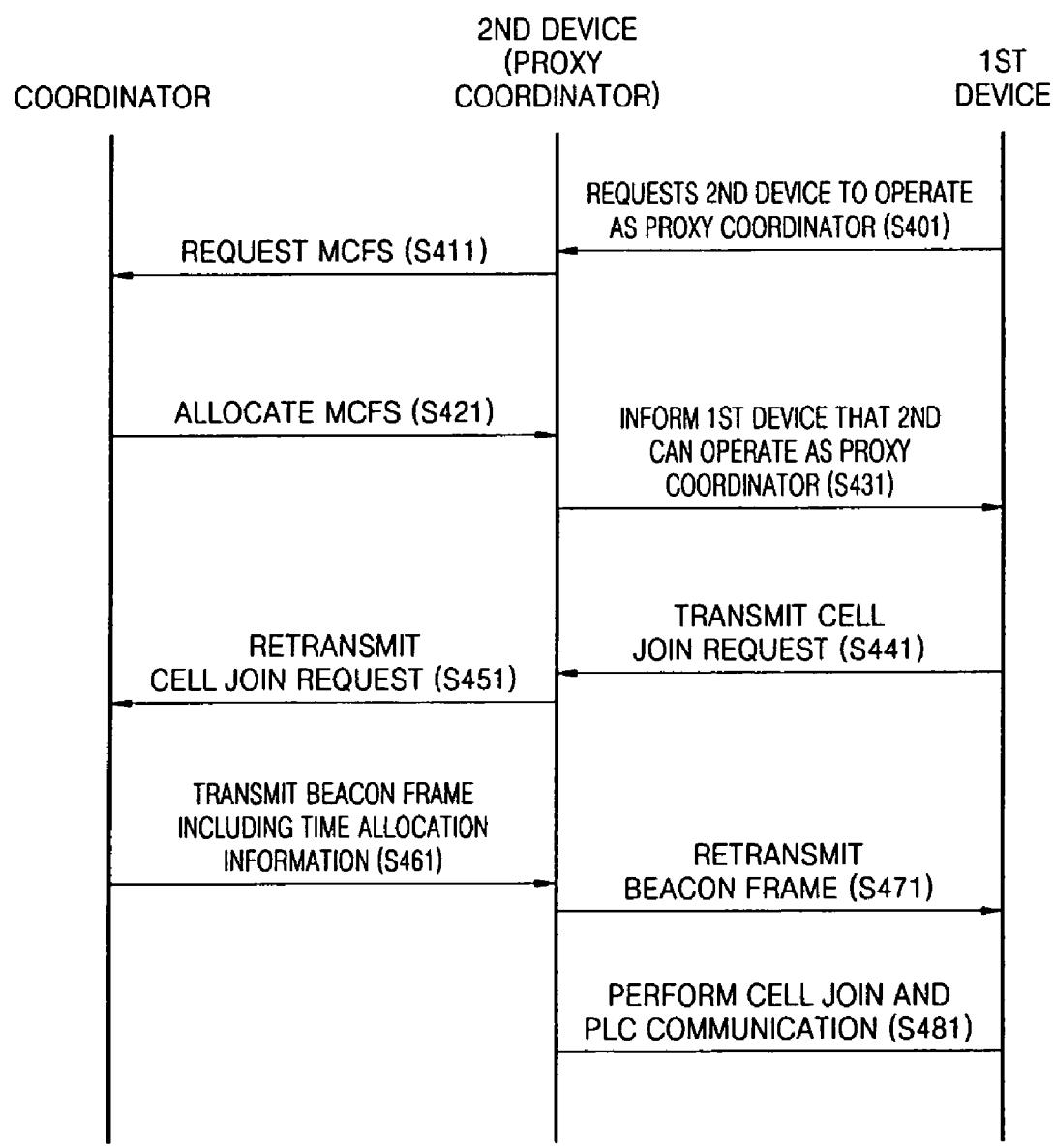
FIG. 4 is a flowchart of a process in which a device positioned out of a beacon frame reachable area joins a cell by using a proxy coordinator according to an embodiment of the present general inventive concept.

FIG. 4 is a flowchart of a process in which a device positioned out of a beacon frame reachable area joins a cell by using a proxy coordinator, according to an embodiment of the present general inventive concept.

In a PLC network, a coordinator transmits a beacon frame to inform member devices in a cell of time synchronization and QoS information.

Referring to FIGS. 3 and 4, since the first device positioned out of the beacon frame reachable area cannot directly receive the beacon frame, in order to select a proxy coordinator to relay the beacon frame, the first device requests through the transmission and reception module 310, the second device adjacent to the first device, to operate as a proxy coordinator in operation S401.

The second device, which is requested to operate as the proxy coordinator, requests through the transmission and reception module 310 the coordinator to allocate a time in which the second device can operate as the proxy coordinator to relay the beacon frame in operation S411.

The coordinator allocates the second device an MCFS slot 232, i.e., a time slot in which the second device can operate as the proxy coordinator in operation S421.

The second device, which is allocated the MCFS slot 232 by the coordinator, informs through the transmission and reception module 310 the first device that the second device can operate as the proxy coordinator in operation S431. That is, the second device is designated as the proxy coordinator to allow the first device to communicate with the PLC cell.

In this way, the first device positioned out of the beacon frame reachable area goes through the above-described negotiation period to select the proxy coordinator.

in the next operation, the first device transmits through the transmission and reception module 310 a cell join request to the proxy coordinator by using the min CAP period 222 that is immediately after a time when the max beacon period 212 finishes in operation S441. That is, if the transmission of the beacon frame is completed, the CAP period 220, that is a contention-based access period in which a transmission medium can be accessed in a CSMA/CA method, follows. If the CAP period 220 is used, even a device that is not separately allocated a time can access a transmission medium through contention. Accordingly, the first device positioned out of the beacon frame reachable area can transmit the cell join request by using the min CAP period 222 of a contention based period, not using the beacon period 210 or the CFP period 230 allocated uniquely to each device.

The proxy coordinator retransmits through the transmission and reception unit 310 the cell join request received from the first device, to the coordinator in operation S451.

The coordinator approves the cell join request of the first device, and sets through the setting module 330 time allocation information for the first device. Then, the coordinator includes the time allocation information in the beacon frame and transmits the beacon frame to the proxy coordinator through the transmission and reception module 310 in operation S461. Since the time allocation information has the time (CFS slot) allocated by the coordinator to the first device and other devices than the first device cannot access a transmission medium during that time, the QoS can be guaranteed to the first device without contention with other devices.

The proxy coordinator retransmits the beacon frame which includes the time allocation information received from the coordinator, through the transmission and reception module 310 to the first device in operation S471. The proxy coordinator may relay the beacon frame by using the MCFS slot 232 that is a time (slot) allocated by the coordinator.

Since the first device is allocated its own time (CFS slot) according to the time allocation information, the first device can access a transmission medium according to the time allocation information without colliding with adjacent devices and can also join the cell and perform PLC communication in operation S481.

According to the cell join method using a proxy coordinator of the present general inventive concept, a device positioned out of a beacon frame reachable area in a PLC network can join a cell without colliding with other existing cell devices, and can perform PLC communication.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of joining a cell by using a proxy coordinator, the method comprising:
   requesting a second device of the cell to operate as a proxy coordinator from a first device that is positioned out of a beacon frame reachable area of the cell and is positioned outside of the cell;
   transmitting a time period to operate as the proxy coordinator allocated by a coordinator of the cell;
   informing the first device that the second device operates as the proxy coordinator;
   transmitting a cell join request to the proxy coordinator from the first device, wherein the cell join request is transmitted to the proxy coordinator within a min CAP (minimum contention-based access period) of a superframe that includes a beacon period, a contention-based access period that includes the min CAP, and a contention-free period, so that the cell join request does not cause a collision with existing cell devices; and
   transmitting the beacon frame including time allocation information from the coordinator to the first device through the proxy coordinator.

2. The method of claim 1, wherein the transmitting of the cell join request to the proxy coordinator comprises:
   transmitting the cell join request using the beacon frame having a contention-based access period.

3. The method of claim 2, wherein the transmitting of the beacon frame comprises:
   transmitting the beacon frame having a time period in which the second device operates as the proxy coordinator.

4. The method of claim 3, further comprising:
   allowing the first device to join the cell according to the time allocation information and performing power line communication.

5. A power line communication (PLC) network, comprising:
- a device included in a PLC cell of a PLC network to receive a first request to designate the device as a proxy coordinator from an external device that is outside the PLC cell that is connected to the device, and a second request to join the PLC cell from the external device; and
- a coordinator included in the PLC cell to generate a beacon frame having a beacon period, a contention-based access period (CAP) to indicate the joining of the external device in the PLC cell, and a contention free period (CFP) to indicate the designation of the device as the proxy coordinator, according to at least one of the first request and the second request, wherein the second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

6. The PLC network of claim 5, further comprising:
a transmission and reception module to transmit and receive data among the external device, the device, and the coordinator.

7. The PLC network of claim 5, further comprising:
an allocation module to allocate a time to the device to act as the proxy coordinator.

8. The PLC network of claim 5, further comprising:
a setting module to set time allocation information to the external device to avoid collision with other devices of the PLC network.

9. The PLC network of claim 5, wherein the CAP is a period in which a transmission medium is accessed in a carrier sense multiple access/collision avoidance method.

10. The PLC network of claim 5, wherein the CFP further comprises:
a time slot to which a device is allocated when another request is made to the coordinator.

11. A power line communication (PLC) network, comprising:
- a coordinator included in the PLC cell to communicate with a device of the PLC cell and an external device out of the PLC cell, and to generate a beacon frame having a beacon period, a contention-based access period (CAP) to indicate the joining of the external device in the PLC cell, and a contention free period (CFP) to indicate the designation of the device as a proxy coordinator according to a request from the external device through the device, wherein the request from the external device is transmitted to the device within a min CAP (minimum contention-based access period) of a superframe that includes a beacon period, a contention-based access period that includes the min CAP, and a contention-free period, so that the request from the external device does not cause a collision with existing cell devices.

12. The PLC network of claim 11, wherein the beacon frame further comprises:
time scheduling and quality of service related information.

13. The PLC network of claim 11, wherein the CAP is a period in which a transmission medium is accessed in a carrier sense multiple access/collision avoidance method.

14. The PLC network of claim 11, wherein the CFP further comprises:
a time slot to which a device is allocated when another request is made to the coordinator.

15. A power line communication (PLC) network, comprising:
a device included in a PLC cell of a PLC network to communicate with an external device out of the PLC cell, to receive a first request to designate the device as a proxy coordinator from the external device connected to the device, and a second request to join the PLC cell from the external device, and to transmit a beacon frame from a coordinator to the external device in response to at least one of the first request and the second request, wherein the second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

16. The PLC network of claim 15, further comprising:
a transmission and reception module to transmit and receive data among the external device, the device, and the coordinator.

17. The PLC network of claim 15, further comprising:
an allocation module to allocate a time to the device to act as the proxy coordinator.

18. The PLC network of claim 15, further comprising:
a setting module to set time allocation information to the external device to avoid collision with other devices.

19. A power line communication (PLC) network, comprising:
a device disposed out of a PLC cell of a PLC network to be connected to another device of the PLC cell of the PLC network, to transmit to the another device a first request to designate the another device as a proxy coordinator, and a second request to join the PLC cell, and to receive a beacon frame having a beacon period, a contention-based access period (CAP) to indicate the joining of the device in the PLC cell, and a contention free period (CFP) to indicate the designation of the another device as the proxy coordinator in response to the first request and the second request, wherein the second request is transmitted to the another device within a min CAP (minimum contention-based access period) of a superframe that includes a beacon period, a contention-based access period that includes the min CAP, and a contention-free period, so that the second request from the device does not cause a collision with existing cell devices.

20. A power line communication (PLC) network, comprising:
- a device disposed out of a PLC cell of a PLC network;
- another device included in the PLC cell of the PLC network and connected to the device to receive a first request to designate the another device as a proxy coordinator from the device, and a second request to join the PLC cell from the device; and
- a coordinator included in the PLC cell to generate a beacon frame having a beacon period, a contention-based access period (CAP) to indicate the joining of the device in the PLC cell, and a contention free period (CFP) to indicate the designation of the device as the proxy coordinator according to the first request and the second request transmitted from the device through the another device, wherein the second request is transmitted to the another device within a min CAP (minimum contention-based access period) of a superframe that includes a beacon period, a contention-based access period that includes the min CAP, and a contention-free period, so that the second request from the device does not cause a collision with existing cell devices.

21. A method of joining a cell by using a proxy coordinator, the method comprising:
   receiving a first request to designate a device of a PLC cell of a PLC network as a proxy coordinator from an external device that is outside the PLC cell that is connected to the device, and a second request to join the PLC cell from the external device; and
   generating a beacon frame having a beacon period, a contention-based access period (CAP) to indicate the joining of the external device in the PLC cell, and a contention free period (CFP) to indicate the designation of the device as the proxy coordinator according to the first request and the second request, wherein the second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

22. A method of joining a cell by using a proxy coordinator, the method comprising:
   communicating with an external device out of the PLC cell, to receive a first request to designate the device as a proxy coordinator from the external device connected to the device and a second request to join the PLC cell from the external device; and
   transmitting a beacon frame from a coordinator to the external device in response to at least one of the first request and the second request, wherein the second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

23. A method of joining a cell by using a proxy coordinator, the method comprising:
   transmitting from a device disposed out of a PLC cell of a PLC network to be connected to another device of the PLC cell of the PLC network to the another device a first request to designate the another device as a proxy coordinator, and a second request to join the PLC cell; and
   receiving a beacon frame having a beacon period, a contention-based access period (CAP) to indicate the joining of the device in the PLC cell, and a contention free period (CFP) to indicate the designation of the device as the proxy coordinator in response to the first request and the second request, wherein the second request is transmitted to the another device within a min CAP (minimum contention-based access period) of a superframe that includes a beacon period, a contention-based access period that includes the min CAP, and a contention-free period, so that the second request from the device does not cause a collision with existing cell devices.

24. A method of joining a cell by using a proxy coordinator, the method comprising:
   disposing a device out of a PLC cell of a PLC network;
   connecting another device included in the PLC cell of the PLC network to the device to receive a first request to designate the another device as a proxy coordinator from the device, and a second request to join the PLC cell from the device; and
   generating a beacon frame having a beacon period, a contention-based access period (CAP) to indicate the joining of the device in the PLC cell, and a contention free period (CFP) to indicate the designation of the another device as the proxy coordinator according to the first request and the second request transmitted from the device through the another device, wherein the second request is transmitted to the another device within a min CAP (minimum contention-based access period) of a superframe that includes a beacon period, a contention-based access period that includes the min CAP, and a contention-free period, so that the second request from the device does not cause a collision with existing cell devices.

25. A non-transitory computer readable recording medium having embodied thereon a computer program to execute a method, wherein the method comprises:
   receiving a first request to designate a device of a PLC cell of a PLC network as a proxy coordinator from an external device that is outside the PLC cell that is connected to the device, and a second request to join the PLC cell from the external device; and
   generating a beacon frame having a beacon period, a contention-based access period (CAP) to indicate the joining of the device in the PLC cell, and a contention free period (CFP) to indicate the designation of the device as the proxy coordinator according to the first request and the second request, wherein the second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

26. A non-transitory computer readable recording medium having embodied thereon a computer program to execute a method, wherein the method comprises:
   communicating with a device of the PLC cell and an external device out of the PLC cell to generate a beacon frame having a beacon period,
   indicating the joining of the external device in the PLC cell; and
   indicating the designation of the device as a proxy coordinator according to a request from the external device through the device, wherein a second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

27. A non-transitory computer readable recording medium having embodied thereon a computer program to execute a method, wherein the method comprises:
   communicating with an external device out of the PLC cell, to receive a first request to designate the device as a proxy coordinator from the external device connected to the device and a second request to join the PLC cell from the external device; and
   transmitting a beacon frame from a coordinator to the external device in response to at least one of the first request and the second request, wherein the second request is transmitted to the device within a min CAP (minimum contention-based access period) of a superframe that includes a beacon period, a contention-based access period that includes the min CAP, and a contention-free period, so that the second request from the external device does not cause a collision with existing cell devices.

28. A non-transitory computer readable recording medium having embodied thereon a computer program to execute a method, wherein the method comprises:

transmitting from a device disposed out of a PLC cell of a PLC network to be connected to another device of the PLC cell of the PLC network to the another device a first request to designate the another device as a proxy coordinator, and a second request to join the PLC cell; and receiving a beacon frame having a beacon period, a contention-based access period (CAP) to indicate the joining of the device in the PLC cell, and a contention free period (CFP) to indicate the designation of the another device as the proxy coordinator in response to the first request and the second request, wherein the second request is transmitted to the another device within a min CAP (minimum contention-based access period) of a superframe that includes a beacon period, a contention-based access period that includes the min CAP, and a contention-free period, so that the second request from the device does not cause a collision with existing cell devices.

29. A non-transitory computer readable recording medium having embodied thereon a computer program to execute a method, wherein the method comprises:

disposing a device out of a PLC cell of a PLC network;

connecting another device included in the PLC cell of the PLC network to the device to receive a first request to designate the another device as a proxy coordinator from the device, and a second request to join the PLC cell from the device; and generating a beacon frame having a beacon period, a contention-based access period (CAP) to indicate the joining of the device in the PLC cell, and a contention free period (CFP) to indicate the designation of the another device as the proxy coordinator according to the first request and the second request transmitted from the device through the another device, wherein the second request is transmitted to the another device within a min CAP (minimum contention-based access period) of a superframe that includes a beacon period, a contention-based access period that includes the min CAP, and a contention-free period, so that the second request from the device does not cause a collision with existing cell devices.

* * * * *